(12) United States Patent
Peroulas et al.

(10) Patent No.: US 10,891,546 B2
(45) Date of Patent: Jan. 12, 2021

(54) NETWORK ANOMALY DETECTION (71) Applicant: Google LLC, Mountain View, CA (US)

(72) Inventors: James Peroulas, San Mateo, CA (US); Poojita Thukral, Mountain View, CA (US); Dutt Kalapatapu, Santa Clara, CA (US); Andreas Terzis, Mountain View, CA (US); Krishna Sayana, Mountain View, CA (US)

(73) Assignee: Google LLC, Mountain View, CA (US)

(*) Notice: Subject to any disclaimer, the term of this patent is extended or adjusted under 35 U.S.C. 154(b) by 78 days.

(21) Appl. No.: 16/397,082

(22) Filed: Apr. 29, 2019

(65) Prior Publication Data
US 2020/0342311 A1  Oct. 29, 2020

(51) Int. Cl.
*G06N 3/08* (2006.01)
*H04W 24/08* (2009.01)
*H04W 84/04* (2009.01)

(52) U.S. Cl.
CPC .............. *G06N 3/08* (2013.01); *H04W 24/08* (2013.01); *H04W 84/042* (2013.01)

(58) Field of Classification Search
CPC ....... G06N 3/08; H04W 24/08; H04W 84/042
See application file for complete search history.

(56) References Cited

U.S. PATENT DOCUMENTS

| | | | |
|---|---|---|---|
| 8,836,536 B2 | 9/2014 | Marwah et al. | |
| 9,094,444 B2 | 7/2015 | Baltatu et al. | |
| 9,342,789 B2* | 5/2016 | Aharoni | G06F 16/35 |
| 2009/0279772 A1* | 11/2009 | Sun | G06T 7/35 382/141 |
| 2011/0320816 A1* | 12/2011 | Yao | G06F 21/316 713/171 |
| 2017/0279685 A1* | 9/2017 | Mota | H04L 43/08 |
| 2017/0279830 A1* | 9/2017 | Mermoud | A61M 15/009 |
| 2018/0097828 A1 | 4/2018 | Coskun | |
| 2018/0212849 A1* | 7/2018 | Hobgood | H04L 43/10 |

* cited by examiner

*Primary Examiner* — Mohammad S Anwar
(74) *Attorney, Agent, or Firm* — Honigman LLP; Brett A. Krueger (57) ABSTRACT

A method for detecting network anomalies includes receiving a control message from a cellular network and extracting one or more features from the control message. The method also includes predicting a potential label for the control message using a predictive model configured to receive the one or more extracted features from the control message as feature inputs. Here, the predictive model is trained on a set of training control messages where each training control message includes one or more corresponding features and an actual label. The method further includes determining that a probability of the potential label satisfies a confidence threshold. The method also includes analyzing the control message to determine whether the control message corresponds to a respective network performance issue. When the control message impacts network performance, the method includes communicating the network performance issue to a network entity responsible for the network performance issue.

30 Claims, 7 Drawing Sheets

NETWORK ANOMALY DETECTION

TECHNICAL FIELD

This disclosure relates to network anomaly detection.

BACKGROUND

Cellular communication networks provide communication content such as voice, video, packet data, messaging, and broadcast for subscriber devices, such as mobile devices and data terminals. The cellular communication network may include a number of base stations that can support communication for a number of subscriber devices across dispersed geographic regions. Generally, when a user device, such as a mobile phone, moves from a proximity of one base station to another, the mobile and fixed components of the cellular network exchange radio measurements and control messages to ensure that the mobile device is always ready to receive and to transmit data to and from outside networks, such as the internet or a voice service. Yet unfortunately, network performance issues may arise for cellular communication networks that detrimentally affect these measurements and control messages. Therefore, without having an accurate way to detect network performance issues, cellular networks may be unable to ensure that a user device is able to receive and to transmit data in a reliable manner according to network capabilities.

SUMMARY

One aspect of the disclosure provides a method for detecting network anomalies. The method includes receiving, at data processing hardware, a control message from a cellular network. The method further includes extracting, by the data processing hardware, one or more features from the control message. The method also includes predicting, by the data processing hardware, a potential label for the control message using a predictive model configured to receive the one or more extracted features from the control message as feature inputs. Here, the predictive model is trained on a set of training control messages where each training control message includes one or more corresponding features and an actual label. The method further includes determining, by the data processing hardware, that a probability of the potential label satisfies a confidence threshold. The method also includes analyzing, by the data processing hardware, the control message to determine whether the control message corresponds to a respective network performance issue impacting network performance of the cellular network. When the control message corresponds to the respective network performance issue impacting network performance, the method includes communicating, by the data processing hardware, the network performance issue to a network entity responsible for the network performance issue.

Implementations of the disclosure may include one or more of the following optional features. In some implementations, predicting the potential label using the predictive model includes predicting a probability distribution over potential labels, the predicted potential label including one of the potential labels in the probability distribution over potential labels. In these implementations, predicting the potential label includes selecting the potential label associated with a highest probability in the probability distribution over potential labels. In some examples, the predictive model includes a multi-class classification model configured to predict one or more types of labels. The predictive model may include a deep neural network or a recurrent neural network. The actual label of each training control message may include a type allocation code (TAC) for a user equipment (UE) device associated with the training control message or an identifier for a network element of the cellular network. In some configurations, the cellular network communicates the control message according to a general packet radio service tunneling protocol (GTP-C) or according to a Diameter protocol. Optionally, the control message corresponds to one of a plurality of control messages sent by a user of the cellular network during a single network session. In some examples, the one or more features extracted from the control message include a message type summary vector representing a number of times a message type occurs within a single session by a user of the cellular network. In some implementations, the features include an amount of data transferred in a time period associated with a single session by a user of the cellular network.

In some examples, when the control message fails to correspond to the respective network performance issue, the method includes receiving, at the data processing hardware, a subsequent control message from the cellular network and extracting, by the data processing hardware, one or more corresponding features from the subsequent control message. The method also includes identifying, by the data processing hardware, that at least one of the one or more corresponding features extracted from the subsequent control message match the one or more features extracted from the control message and, prior to using the predictive model to predict a corresponding potential label for the subsequent control message, removing, by the data processing hardware, the identified at least one of the one or more features extracted from the subsequent control message as feature inputs to the predictive model.

In some implementations, when the control message fails to correspond to the respective network performance issue, the method includes identifying, by the data processing hardware, the one or more features extracted from the control message. Here, the method also includes prior to using the predictive model to predict a corresponding potential label for a subsequent control message, modifying, by the data processing hardware, the set of training control messages by removing each training control message that includes one or more corresponding features that match any of the identified one or more features extracted from the control message and retraining, by the data processing hardware, the predictive model with the modified set of training control messages.

Another aspect of the disclosure provides a system for detecting a network anomaly. The system includes data processing hardware and memory hardware in communication with the data processing hardware. The memory hardware stores instructions that when executed on the data processing hardware cause the data processing hardware to perform operations. The operations include receiving a control message from cellular network. The operations further include extracting one or more features from the control message. The operations also include predicting a potential label for the control message using a predictive model configured to receive the one or more extracted features from the control message as feature inputs. Here, the predictive model is trained on a set of training control messages where each training control message includes one or more corresponding features and an actual label. The operations further include determining that a probability of the potential label satisfies a confidence threshold. The operations also include analyzing the control message to determine whether the control message corresponds to a respective network performance issue impacting network performance of the cellular network and when the control message corresponds to the respective network performance issue impacting network performance, communicating the network performance issue to a network entity responsible for the network performance issue.

This aspect may include one or more of the following optional features. In some implementations, predicting the potential label using the predictive model includes predicting a probability distribution over potential labels where the predicted potential label includes one of the potential labels in the probability distribution over potential labels. In these implementations, predicting the potential label includes selecting the potential label associated with the highest probability in the probability distribution over potential labels. In some examples, the predictive model includes a multi-class classification model configured to predict one or more types of labels. The predictive model may include a deep neural network or a recurrent neural network. The actual label of each training control message may include a type allocation code (TAC) for a user equipment (UE) device associated with the training control message or an identifier for a network element of the cellular network. In some configurations, the cellular network communicates the control message according to a general packet radio service tunneling protocol (GTP-C) or according to a Diameter protocol. Optionally, the control message corresponds to one of a plurality of control messages sent by a user of the cellular network during a single network session. In some examples, the one or more features extracted from the control message include a message type summary vector representing a number of times a message type occurs within a single session by a user of the cellular network. In some implementations, the features include an amount of data transferred in a time period associated with a single session by a user of the cellular network.

In some examples, when the control message fails to correspond to the respective network performance issue, the operations include receiving a subsequent control message from the cellular network and extracting one or more corresponding features from the subsequent control message. Here, the operations also include identifying that at least one of the one or more corresponding features extracted from the subsequent control message match the one or more features extracted from the control message and, prior to using the predictive model to predict a corresponding potential label for the subsequent control message, removing the identified at least one of the one or more features extracted from the subsequent control message as feature inputs to the predictive model.

In some implementations, when the control message fails to correspond to the respective network performance issue, the operations include identifying the one or more features extracted from the control message. Here, the operations also include prior to using the predictive model to predict a corresponding potential label for a subsequent control message, modifying the set of training control messages by removing each training control message that includes one or more corresponding feature that match any of the identified one or more features extracted from the control message and retraining the predictive model with the modified set of training control messages.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Cellular networks may suffer from an array of network issues (e.g., degrading hardware, misconfigurations between network elements, unreliable updates or upgrades to network equipment, etc.). The network issues may impact network performance and cause users of a cellular network (i.e., subscribers of a cellular network) to have a poor user experience with the cellular network. The poor user experience may result in user frustration and perhaps even a user switching network operators (i.e., network providers) as a means to resolve the network performance issues.

Network providers (or operators) have an incentive to address these issues because network issues may affect their customer loyalty and may have a detrimental impact on their cellular services. Without resolving network issues, these issues could cost network operators business and potentially damage a network operator's goodwill and/or brand. Yet often network operators do not experience the network performance issues firsthand. In other words, users of a cellular network are the ones generally impacted by network performance issues. This means that network operators often may have to rely on the network users to report network issues when they occur. However, there are a few problems with user-reporting to address network issues. First off, network users not only need to recognize that the issues they are experiencing are likely due to their cellular network, but also to take their time to report the issue to the network operator in some manner. Clearly, this approach is not likely to work well for users who fail to recognize that they are experiencing less-than-ideal performance. For instance, a user becomes accustom to below-average network performance or does not realize that the network performance should be better. Here, this type of user may never inform the network operator that a network performance issue is present and simply changes cellular network providers thinking that another provider might result in better performance. In other words, the original cellular provider may never have the opportunity to address the problem. Furthermore, when a user does report a network performance issue to a network operator, the network operator performs an investigation of the reported issue. These investigations may be a labor intensive process that may leave some user issues unsolved due to a lack of available resources to investigate/address all reported problems. Particularly, network operators may often have to prioritize labor resources to operating the cellular network rather than investigating reported user issues.

Another approach is that the network operator monitors the cellular network to detect anomalies that may indicate a network performance issue. An anomaly refers to a unique occurrence (or different behavior) during signaling for a cellular network. Here, an anomaly itself is agnostic as to whether the unique occurrence is an occurrence that indicates detrimental behavior (e.g., a network performance issue) or an occurrence that indicates non-detrimental behavior (e.g., not a network performance issue). Yet by identifying anomalies, a network operator may analyze an anomaly to determine whether the anomaly corresponds to a network performance issue.

Detecting anomalies within a cellular network has traditionally had its drawbacks. For instance, depending on the cellular usage and traffic, cellular networks could have an immense amount of log data (e.g., network logs, inter-process logs, usage statistics, etc.). Sifting through the immense amounts of data to identify an anomaly may be resource intensive. Therefore, when an anomaly was detected that impacted network performance, an entity detecting the anomaly (e.g., the network operator) may develop a rule to more easily detect the same or similar anomaly in other instances. This traditional form of anomaly detection therefore generates one or more rules to identify a deviation from normal behavior. For instance, a rule defines that a certain message type typically occurs at a rate of five times a second. When that certain message type occurs more or less times per second, this rule would allow a system to detect this deviation as an anomaly. Unfortunately, the issue with this form of anomaly detection is that an entity must first specify what is considered normal behavior to identify anomalies with behavior outside of the specified normality. Here, this method only works for known anomalies dictated by known rules. In other words, a new anomaly that impacts network performance will be undetected until a rule specifically addresses the new anomaly (or the normal behavior that should be occurring instead of the new anomaly). This approach lacks any ability to be predictive for new anomalies that may cause performance issues. Thus, a predictive anomaly detector may more accurately use anomalies to detect network performance issues.

Figure 1:
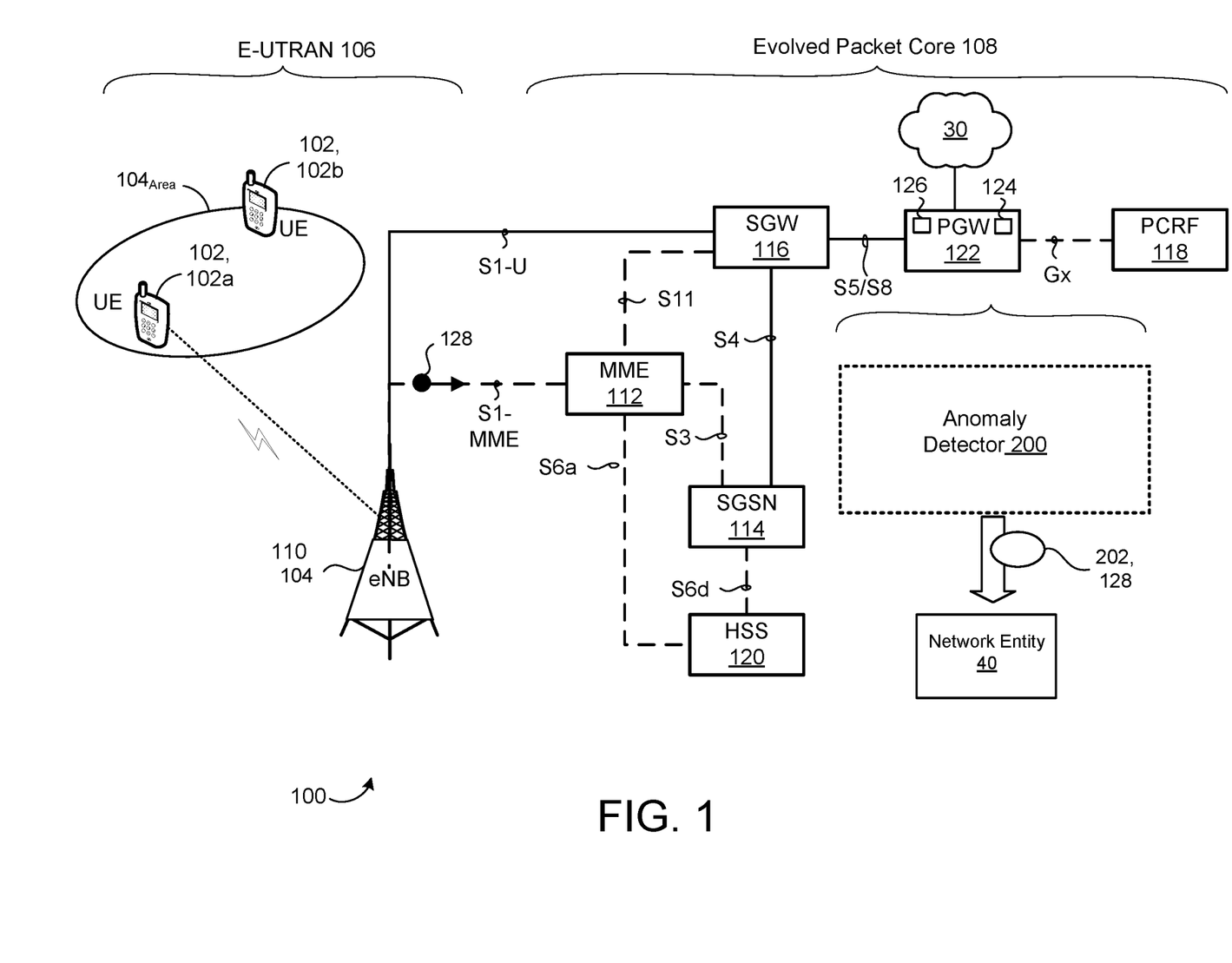
FIG. 1 is a schematic view of an example communication network.

FIG. 1 illustrates a communication network 100 (also referred to as a cellular network), which may be a Long-Term Evolution (LTE) network, a 5G network, and/or a multiple access network supporting numerous access technologies specified by the 3$^{rd}$ Generation Partnership Project (3GPP), such as the General Packet Radio Service (GPRS), the Global System for Mobile Communications/Enhanced Data Rates for GSM Evolution (GSM/EDGE), the Universal Mobile Telecommunication System/High Speed Packet Access (UMTS/HSPA), LTE and LTE advanced network technologies. The cellular network 100 (e.g., LTE network) enables wireless communication of high-speed data packets between subscriber devices 102, 102a-b, such as mobile phones and data terminals, and a base station 104. The subscriber devices 102 may be interchangeably referred to as user equipment (UE) devices and/or mobile devices 102. For instance, LTE is a wireless communication standard that is based on the GSM/EDGE and UMTS/HSPA network technologies and configured to increase the capacity and speed of the telecommunication by using different radio interfaces in addition to core network improvements. Different types of cellular networks 100 may support different bands/frequencies at various bandwidths to allow UE devices 102 to communicate data (e.g., data packets). To illustrate, LTE supports scalable carrier bandwidths, from 1.4 MHz to 20 MHz and supports both frequency division duplexing (FDD) and time-division duplexing (TDD) while 5G supports bandwidths ranging from 5 MHz to 100 MHz where some bandwidths overlap with LTE.

UE devices 102 may be any telecommunication device that is capable of transmitting and/or receiving voice/data over the network 100. UE devices 102 may include, but are not limited to, mobile computing devices, such as laptops, tablets, smart phones, and wearable computing devices (e.g., headsets and/or watches). UE devices 102 may also include other computing devices having other form factors, such as computing devices included in desktop computers, smart speakers/displays, vehicles, gaming devices, televisions, or other appliances (e.g., networked home automation devices and home appliances). UE devices 102 subscribe to network services provided by a network operator of the communication network 100. The network operator may also be referred to as a mobile network operator (MNO), a wireless service provider, wireless carrier, cellular company, or mobile network carrier.

The UE devices 102 may communicate with an external network 30, such as a packet data network (PDN), through the communication network 100 (or 5G/3G/2G network). Referring to FIG. 1, the communication network 100 is an LTE network that includes a first portion, an Evolved Universal Terrestrial Radio Access Network (e-UTRAN) portion 106, and a second portion, an Evolved Packet Core (EPC) portion 108. The first portion 106 includes an air interface 110 (i.e., Evolved Universal Terrestrial Radio Access (e-UTRA)) of 3GPP's LTE upgrade path for mobile networks, UE devices 102, and multiple base stations 104. The LTE air interface 110 uses orthogonal frequency-division multiple access (OFDMA) radio-access for the downlink and Single-carrier FDMA (SC-FDMA) for the uplink. Accordingly, the first portion 106 provides a radio access network (RAN) that supports radio communication of data packets and/or other surfaces from the external network 30 to the UE devices 102 over the air interface 110 via one or more base station 104.

Each base station 104 may include an evolved Node B (also referred as eNode B or eNB). An eNB 104 includes hardware that connects to the air interface 110 (e.g., a mobile phone network) for communicating directly with the UE devices 102. For instance, the eNB 104 may transmit downlink LTE/3G/5G signals (e.g., communications) to the UE devices 102 and receive uplink LTE/3G/5G signals from the UE devices 102 over the air interface 110. A base station 104 may have an associated coverage area 104 area that corresponds to an area where one or more UE devices 102 communicate with the network 100 by way of the base station 104. The eNBs 104 use a S1 interface for communicating with the EPC 108. The S1 interface may include an S1-MME interface for communicating with a Mobility Management Entity (MME) 112 and an S1-U interface for interfacing with a Serving Gateway (SGW) 116. Accordingly, the S1 interface is associated with a backhaul link for communicating with the EPC 108.

The EPC 108 provides a framework configured to converge voice and data on the LTE network 100. The EPC 108 unifies voice and data on an Internet Protocol (IP) service architecture and voice is treated as just another IP application. The EPC 108 includes, without limitation, several network elements, such as the MME 112, a Serving GPRS Support Node (SGSN) 114, the SGW 116, a Policy and Charging Rules Function (PCRF) 118, a Home Subscriber Server (HSS) 120, and a Packet Data Node Gateway (PGW) 122, The PGW 122 may also be referred to as a network gateway device 122, and when the network corresponds to a 3G network, the network gateway device 122 includes a Gateway GPRS Support Node (GGSN) instead of the PGW 122. Optionally, when the network corresponds to a 5G or 5G+ network, the network gateway device 122 may include a gateway node with a naming convention as defined by the 5G and/or 5G+ network. The MME 112, the SGSN 114, the SGW 116, the PCRF 118, the HSS 120, and the PGW 122 may be standalone components, or at least two of the components may be integrated together. The EPC 108 communicates with the UE devices 102 and the external network 30 to route data packets therebetween.

The network 100 includes interfaces that allow the UE devices 102, the base stations 104, and various network elements (e.g., the MME 112, the SGSN 114, the SGW 116, the PCRF 118, the HSS 120, and the PGW 122) to cooperate with each other during use of the network 100. Information flows along these interfaces throughout the network 100 and generally these interfaces may be divided into a user plane and a control plane. The user plane routes user plane traffic and includes a user plane protocol stack between the UE devices 102 and the base station 104 with sublayers, such as packet data convergence protocol (PDCP), radio link control (RLC), and medium access control (MAC). Some interfaces specific to the user plane, shown in solid lines between the network elements, are as follows: a S1-U interface between the base station 104 and the SGW 116 for per bearer user plane tunneling and inter base station path switching during handover; a S4 interface between a UE device 102 with 2G access or 3G access and the PGW 122 for control and mobility support and, in some cases, user plane tunneling; and a S12 interface (not shown) between the E-UTRAN portion 106 (e.g., UE device 102) and the SGW 116 for user plane tunneling as an operator configuration option. Other types of communication networks (e.g., 3G, 5G, etc.) may include other user plane interfaces besides the ones depicted in FIG. 1 for the network 100.

The control plane is responsible for controlling and supporting user plane functions with control plane protocols. Particularly, the control plane controls E-UTRAN access connections (e.g., attaching and detaching from the E-UTRAN portion 106 of the network 100), controls attributes of an established network access connection (e.g., an activation of an IP address), controls routing paths of an established network connection (e.g., to support user mobility), and/or controls an assignment of network resources based on demands to the network 100 (e.g., by a user of a UE device 102). Some interfaces specific to the control plane, shown in dotted lines between network elements, are as follows: a S1-MME interface between the base station 104 and the MME 112 that guarantees delivery of signaling messages; a S3 interface between the SGSN 114 and the MME 112 that enables user/bearer information exchange for inter 3GPP access network mobility in idle and/or active states; a S5/S8 interface between the SGW 116 and the PGW 122 where the S5 interface is used in a non-roaming scenario to serve relocation based on UE device 102 mobility and to connect to a non-collocated gateway of a PDN while the S8 interface connects to public land mobile networks (PLMN); an S10 interface that coordinates handovers between MMEs 112; a S11 interface between the MME 112 and the SGW 116 for transferring signal messages; a S6a interface between the MME 112 and the HSS 120 that enables transfer of subscription and authentication data related to user access; a S6d interface between the HSS 120 and the SGSN 114 that also enables transfer of subscription and authentication data related to user access; and a S13 interface (not shown) that supports a UE device 102 identity check. Other types of communication networks (e.g., 3G, 5G, etc.) may include other control plane interfaces besides the ones depicted in FIG. 1 for the network 100.

When a particular UE device 102 connects to the network 100, one or more control messages 128 are sent among the various network elements (e.g., between the network elements of the evolved packet core 108 and the E-UTRAN portion 106). For instance, as illustrated by FIG. 1, the base station 104 sends a control message 128 to the MME 112 indicating that a new UE device 102 is attempting to connect to the network 100. As another example, the SGW 116 sends a control message 128 to the MME 112 indicating that data from the external network 30 has arrived for a particular UE device 102 and that the UE device 102 needs to be awoken (or paged) to establish tunnels in order to accept the waiting data. The control plane interfaces may transmit such control messages 128 using control plane protocols, such as a general packet radio service tunneling control (GTP-C) protocol or a Diameter protocol. The type of protocol used to transmit a control message 128 may depend on the interface. For instance, the S3, S5/S8, and S10 interfaces use GTP-C protocol while the S11, S6a, S6d, and S13 interfaces use Diameter protocol.

The MME 112 is a key control-node for the LTE network 100. The MME 112 manages sessions and states and authenticates and tracks a UE device 102 across the network 100. For instance, the MME 112 may perform various functions such as, but not limited to, control of signaling and security for a Non Access Stratum (NAS), authentication and mobility management of UE devices 102, selection of gateways for UE devices 102, and bearer management functions. The SGSN 114 may act in some ways similar to the MME 112. For instance, the SGSN 114 tracks the location of a UE device 102 and performs security and access control functions. In some examples, the SGSN 114 is responsible for mobility management (e.g., of a standby mode UE device 102), logical link management, authentication, charging functions, and/or handling overload situations. The SGW 116 performs various functions related to IP data transfer for user devices 102, such as data routing and forwarding, as well as mobility anchoring. The SGW 116 may perform functions such as buffering, routing, and forwarding of data packets for mobile devices 102.

The PCRF 118 is a node responsible for real-time policy rules and charging in the EPC 108. In some examples, the PCRF 118 is configured to access subscriber databases (i.e., UE device users) to make policy decisions. Quality of service management may be controlled by dynamic policy interactions between the PCRF 118 and the network gateway device 122. Signaling by the PCRF 118 may establish or modify attributes of an EPS bearer (i.e., a virtual connection between the UE device 102 and the PGW 122). In some configurations, such as voice over LTE (VoLTE), the PCRF 118 allocates network resources for establishing calls and distributing requested bandwidth to a call bearer with configured attributes.

The HSS 120 refers to a database of all UE devices 102 that includes all UE device user data. Generally, the HSS 120 is responsible for authentication for call and session setup. In other words, the HSS 120 is configured to transfer subscription and authentication data for user access and UE context authentication. The HSS 120 interacts with the MME 112 to authenticate the UE device 102 and/or UE device user. The MME communicates with the HSS 120 on the PLMN using Diameter protocol (e.g., via the S6a interface).

The PGW 122 (i.e., network gateway device) performs various functions such as, but not limited to, internet protocol (IP) address allocation, maintenance of data connectivity for UE devices 102, packet filtering for UE devices 102, service level gating control and rate enforcement, dynamic host configuration protocol (DHCP) functions for clients and servers, and gateway general packet radio service (GGSN) functionality.

In some implementations, data processing hardware 124 of the network gateway device 122 (e.g., PGW or GGSN or a gateway node with another naming convention as defined by 5G and/or 5G+ networks) receives control messages 128 associated with at least one UE device 102. The data processing hardware 124 may receive the control messages 128 based on interaction(s) that at least one UE device 102 has with the network 100 within the coverage area 104 area of the base station 104.

Referring further to FIG. 1, the communication network 100 also includes an anomaly detector 200. In some examples, the anomaly detector 200 is part of the network gateway device 122 (e.g., PGW or GGSN or a gateway node with another naming convention as defined by 5G and/or 5G+ networks). For instance, data processing hardware 124 and/or memory hardware 126 of the network gateway device 122 host the anomaly detector 200 and execute the functionality of the anomaly detector 200. In some implementations, the anomaly detector 200 communicates with the E-UTRAN portion 106 and the EPC 108, but resides on the external network 30 (e.g., data processing hardware corresponding to the external network 30). In other words, the external network 30 may be a distributed system (e.g., a cloud environment) with its own data processing hardware or shared data processing hardware (e.g., shared with the network gateway device 122). In other configurations, a network element other than the network gateway device 122 implements the anomaly detector 200. Additionally or alternatively, the anomaly detector 200 resides across more than one network element of the network 100.

Generally, the anomaly detector 200 is configured to detect anomalies that occur within the network 100 based on one or more control messages 128. With a detected anomaly, the anomaly detector 200 analyzes whether the anomaly corresponds to a network performance issue 202 that impacts a performance of the network 100. In other words, the anomaly detector 200 identifies a unique occurrence (i.e., the anomaly) within the network 100 and determines whether the unique occurrence is detrimental to the performance of the network 100 (or negatively impacts a user experience). When the anomaly detector 200 identifies that the detected anomaly impacts network performance, the anomaly detector 200 is configured to inform a network entity 40 responsible for the network performance issue 202 or relay the network performance issue 202 to an entity that knows or communicates with the responsible entity. For instance, the anomaly detector 200 may signal or inform the network operator of the network performance issue 202 corresponding to the detected anomaly. In some implementations, the anomaly detector 200 communicates the one or more control messages 128 that indicated the network anomaly to the network entity 40. Here, the network entity 40 may further analyze one or more control messages 128 to help resolve the network issue 202.

Referring to FIGS. 2A-2D, the anomaly detector 200 generally includes a collector 210, an extractor 220, a predictor 230, and an analyzer 240. The collector 210 is configured to receive at least one control message 128 from the network 100. In some implementations, the collector 210 includes a datastore 212 to collect control messages 128 from the network 100 in order to function as a central database for logging data corresponding to the control messages 128. With the collector 210, the anomaly detector 200 may process the control messages 128 in a variety of ways to create training data (e.g., training control messages) that may be used to detect anomalies. For instance, the collector 210 groups together (e.g., within the datastore 212) control messages 128 from a single session of a UE device 102. In some examples, a session refers to a time period from when a user (via the UE device 102) initiates a CreateSessionRequest or CreatePdpRequest message to when the user terminates the session with a DeleteSessionResponse or DeletePdpContextRequest message. As another example, the collector 210 groups control messages 128 together to indicate an amount of data 129 that was transferred (e.g., either in an uplink direction, a downlink direction, or both) within a certain time period (e.g., during a session). With these control messages 128 grouped together, the collector 210 forms a representation of a total amount of data 129 for a certain time period.

In other configurations, the collector 210 collects the log data as a sequence such that the control messages 128 are strung together as a time series (e.g., $t_0$-$t_3$. Here, the string of control messages 128 may be aggregated by an entity (e.g., a particular user or UE device 102) or by sessions of the entity. If these sequences become too long, the collector 210 may be configured to dissect these sequences into sub-sequences of a fixed length and associate any identifiers of the original sequence to each sub-sequence. Otherwise, a sequence may have a label (e.g., a particular entity or UE device 102) that when the collector 210 dissects the sequence would fail to transfer to one or more sub-sequences.

The extractor 220 is configured to extract information from one or more control messages 128 and/or log data corresponding to control messages 128. The extractor 220 may extract one or more features 222 and/or one or more labels 224 from the one or more control messages 128 (or parts thereof). Each feature 222 and/or label 224 refers to a characteristic derived from a control message 128. In some examples, a label 224 is a characteristic of a network element, a UE device 102, a user of a UE device, or a base station 104 that is generally obfuscated due to 3GPP standardization of the network 100. In other words, although the extractor 220 may generate an actual label 224 directly from a control message 128 (or log data relating to a control message 128), it should not be possible to contextually determine the actual label 224 simply from one or more control message 128 when the network 100 is 3GPP compliant. One such example of a label 224 is a type allocation code (TAC) that identifies a wireless device (e.g., a mobile phone type of a UE device 102). Other examples of labels 224 may include, without limitation, identifiers corresponding to network elements of the network 100 (e.g., a MME identifier, a base station identity code (BSIC), an international mobile equipment identity (IMEI), E-UTRAN cell identity (ECI)/E-UTRAN cell global identifier (ECGI), etc.)

On the other hand, a feature 222 corresponds to another characteristic derived from a control message 128 that is different than the characteristic forming the label 224. Here, unlike for a label 224, a feature 222 of a control message 128 may be discernable even when the network 100 is 3GPP compliant. Some examples of features 222 include a control message type (e.g., represented as an integer), a cause type for GTP-C messages, an amount of time elapsed between adjacent messages (e.g., when the collector 210 sequences the control messages 128), etc. In some examples, the extractor 220 extracts different features 222 from different control message protocols. For instance, features 222 extracted from GTP-C messages would be different than features 222 extracted from Diameter messages. In some examples, features 222 extracted by the extractor 220 are crossed to create new features 222. A cross of features 222 refers to a combination of a portion of two or more features 222. For example, the extractor 220 crosses the message type feature 222 and the cause value feature 222 to generate a message type-cause value feature 222. By crossing features 222, the extractor 220 may provide additional training data sets potentially increasing the ability of the anomaly detector 200 to detect anomalies.

Whether the extractor 220 extracts a feature 222 and/or a label 224 may depend on a stage of the anomaly detector 200. In a first stage (e.g., training stage), the anomaly detector 200 trains to be able to predict network anomalies. In order to train the anomaly detector 200, the extractor 220 extracts information from one or more control messages 128 at the collector 210. The extracted information forms a training control message 226 that includes one or more features 222 and an actual label 224. By including the actual label 224 as a ground truth with the training control message 226, the anomaly detector 200 learns which features 222 may correspond to which label 224. In a second stage (e.g., inference), after the anomaly detector 200 is trained, the extractor 220 no longer provides training control messages 226 with both features 222 and a label 224. Instead, the extractor 220 extracts one or more features 222 from a control message 128 and relies on the trained anomaly detector 200 to predict the label 224. In other words, as processing each control message 128 to extract an actual label 224 therefrom is time-sensitive, and therefore not practical in real-time, the trained anomaly detector 200 may predict potential labels 234 using only the features 22 extracted from the control message 128 as feature inputs.

The predictor 230 is configured to use a predictive model 232 to predict a potential label 234 for a control message 128 associated with the one or more features 222 extracted from the control message 128 by the extractor 220. Ideally, because of the standardization of 3GPP, it should not be possible for the predictor 230 to generate a prediction P where the potential label 234 matches (i.e., correctly predicts) the actual label 224 for a given control message 128. Thus, when the predictor 230 predicts a potential label 234 that matches the actual label 224 from at least one control message 128 (e.g., features 222 of a control message 128), this match indicates a unique correlation (i.e., a detected anomaly) between the control message(s) 128 and the labels 224, 234.

When the predictor 230 generates a correct prediction P, the analyzer 240 analyzes the related control message 128 and/or the log data corresponding to the control message 128. Here, the analyzer 240 analyzes the control message 128 to determine whether the control message 128 corresponds to a network performance issue 202 impacting network performance of the network 100. In other words, the analyzer 240 determines whether the detected anomaly is a unique correlation due to detrimental behavior or whether the detected anomaly is simply unique behavior with little to no impact on network performance or user experience. When the analyzer 240 determines that the detected anomaly of the control message 128 impacts network performance, the analyzer 240 flags this detrimental behavior to be fixed. To fix the behavior, the analyzer 240 may communicate the network performance issue 202 to the network entity 40 (e.g., a network operator or a UE device provider) responsible for the network performance issue 202.

In some configurations, the analyzer 240 performs clustering. Clustering may be beneficial where there are too many anomalies occurring with a network 100 to investigate. Instead of investigating each and every detected anomaly, the analyzer 240 clusters the detected anomalies into similar groups. By clustering into groups, the analyzer 240 may prioritize larger clusters that potentially may have more detrimental impact on the network 100 (e.g., ranking clusters by network impact or likelihood/probability of network impact). Furthermore, when the analyzer 240 relies on human analysis to determine whether or not the detected anomaly corresponds to a network performance issue 202, the analyzer 240 may use an autoencoder to perform dimensionality reduction. Dimensionality reduction by an autoencoder is configured to reduce large data sets (i.e., a large number of anomalies) by correlating redundant features in the large data sets. Here, as a neural network trained according to gradient descent, an autoencoder performs dimensionality reduction by trying to identify new structures or uniqueness in a data set. In other words, the autoencoder may isolate more unique anomalies for the network 100 that may more likely correlate to network performance issues 202 that should be analyzed. By combining clustering and autoencoding, a large number of anomalies may be formed into smaller groups (clusters) and then further reduced to make efficient use of human and/or computations resources.

The predictor 230 predicts the potential label 234 using the predictive model 232. In some examples, the predictive model 232 is a neural network (e.g., a deep neural network (DNN), a recurrent neural network (RNN), or a convolution neural network (CNN)). To generate predictions P, the predictive model 232 undergoes model training. Here, training for the predictive model 232 occurs using examples (also referred to as training data or a training data set) that correspond to control messages 128 and/or their related log data. In some implementations, the extractor 220 generates a set 228 of training control messages 226 as examples to train the predictive model 232 (e.g., shown in FIG. 2B). In some configurations, each training control message 226 corresponds to a control message 128 processed at the collector 210. The extractor 220 may form each training control message 226 by extracting one or more features 222 from a control message 128 along with the actual label 224 for the control message 128. In some examples, when more than one control message 128 has the same label 224, the features 222 of these control messages 128 are combined into one example or set 228 of training control messages 226. For example, the extractor 220 creates a message type vector summary to account for each type of control message 128 included in a combination. The message type vector summary may include one entry for each possible message type to represent a number of times that a particular control message 128 was encountered (e.g., within a single session).

Figure 2A:
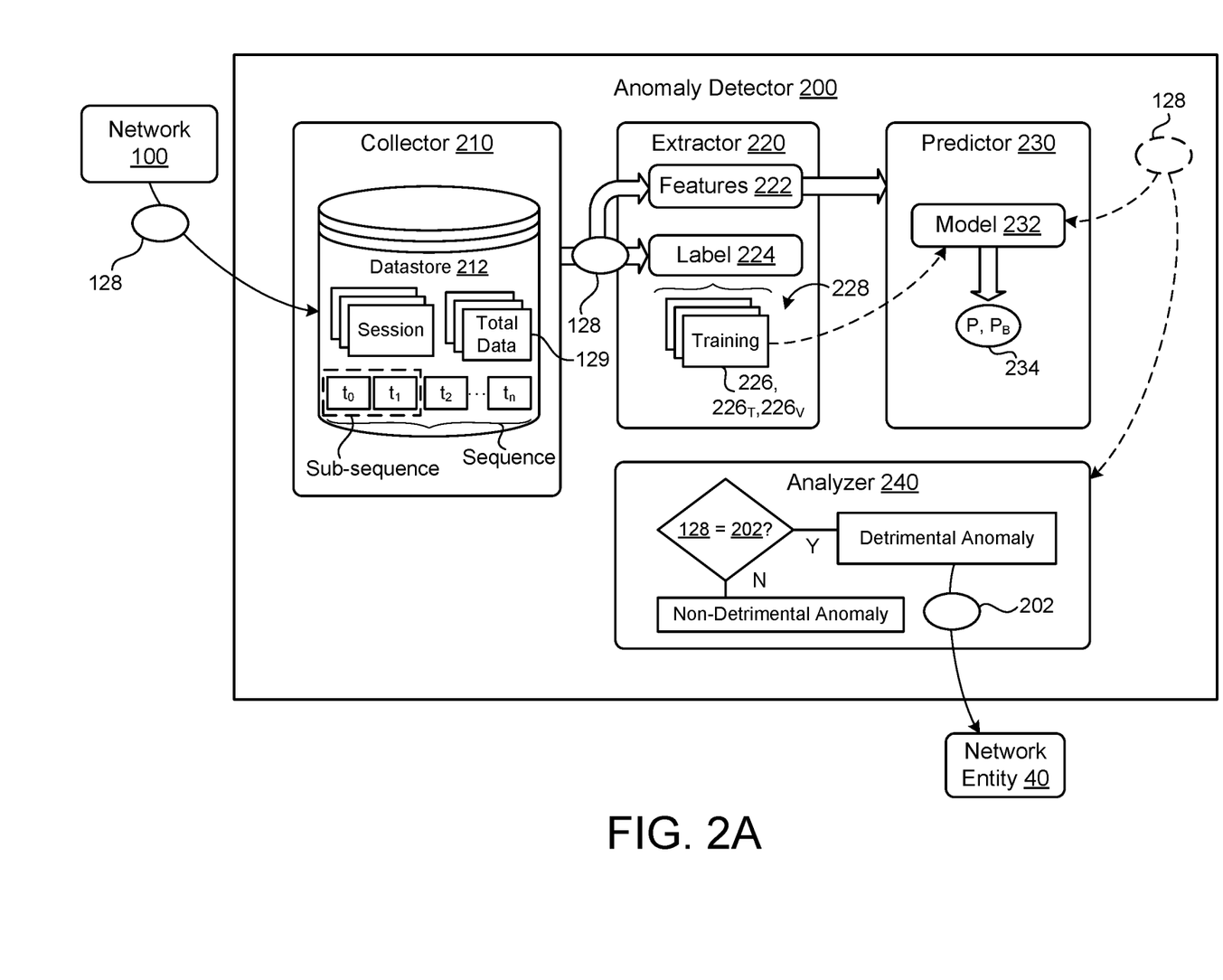
FIGS. 2A-2D are schematic views of example anomaly detectors for the communication network of FIG. 1.
Figure 2B:
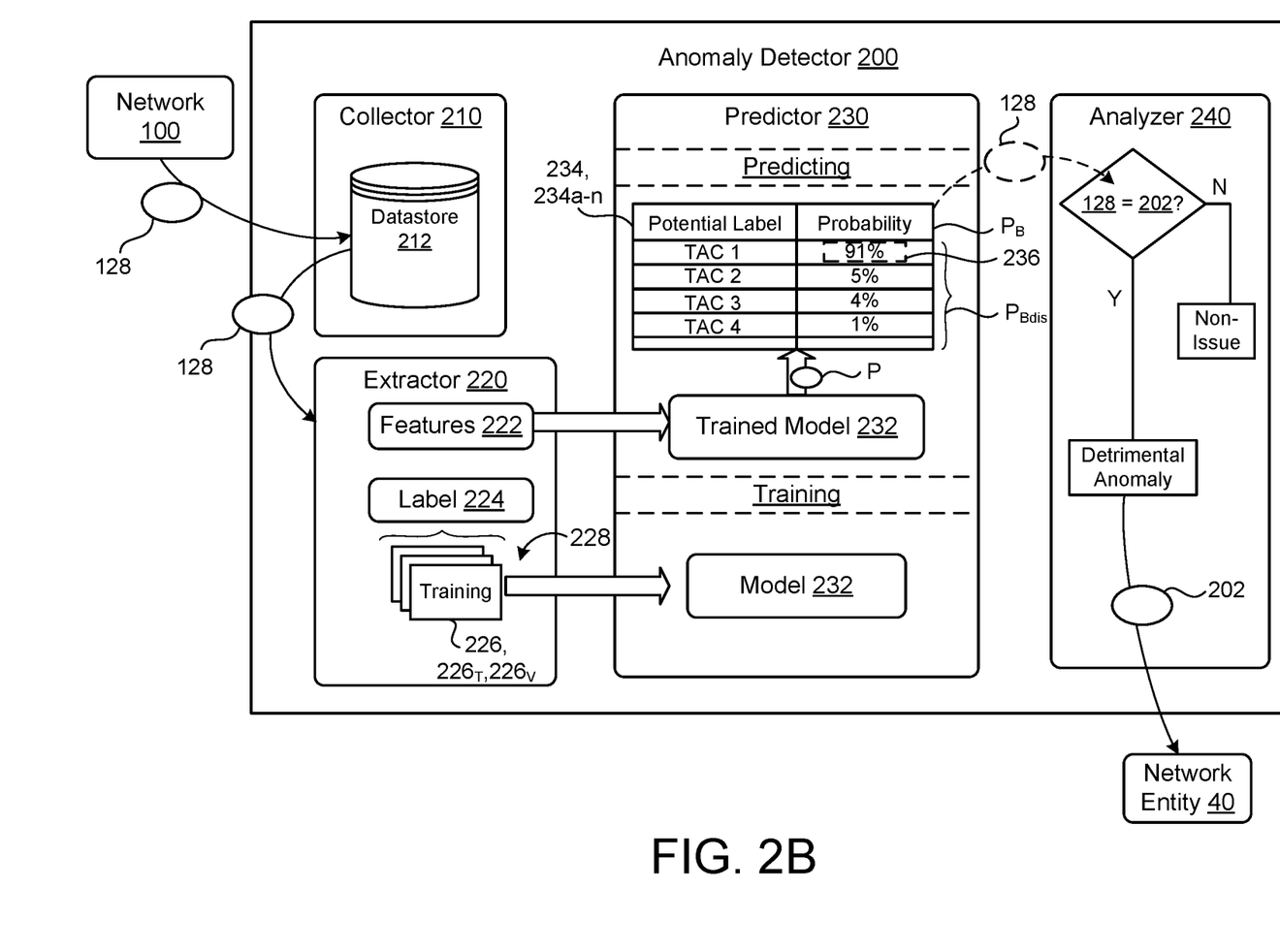

In order to train the predictive model 232, the predictor 230 divides the set 228 of training control messages 226 into a training set 226T and validation set 226v. In some examples, in addition to the training set 226T and validation set 226v, the training control messages 226 are also split into a test set. The predictive model 232 trains on the training set 226T while using the validation set 226v to determine when to stop training (e.g., to prevent over-fit). The training may stop when a performance of the predictive model 232 reaches a particular threshold or when the performance of the predictive model 232 on the validation set 226v stops decreasing. In some examples, the training set 226T evaluates the final performance for the predictive model 232. In some implementations, the predictive model 232 is trained as a multiclass classification model. As a multiclass classification model, the predictive model 232 outputs a probability distribution $P_{Bdis}$ representing an opinion regarding the probability PB for each class. For instance, when the predictive model 232 predicts TAC, each TAC will be a different class such that the predictive model 232 will output a probability distribution for each class of TAC.

In some examples, the process of training and evaluating the predictive model 232 occurs continuously to provide early detection of new network issues 202 that may arise. Once the training is complete, predictions P from the training may be fed back into the predictive model 232. These predictions P may correspond to the training sets 226T, the validations sets 226v, the test sets, or any combination thereof. In other words, the predictive model 232 is configured to evaluate its predictions P from training on the training data (e.g., the set 228 of training control messages 226). This approach may ensure the predictive model 232 has completed training and is ready to predict potential labels 234

Figure 2C:
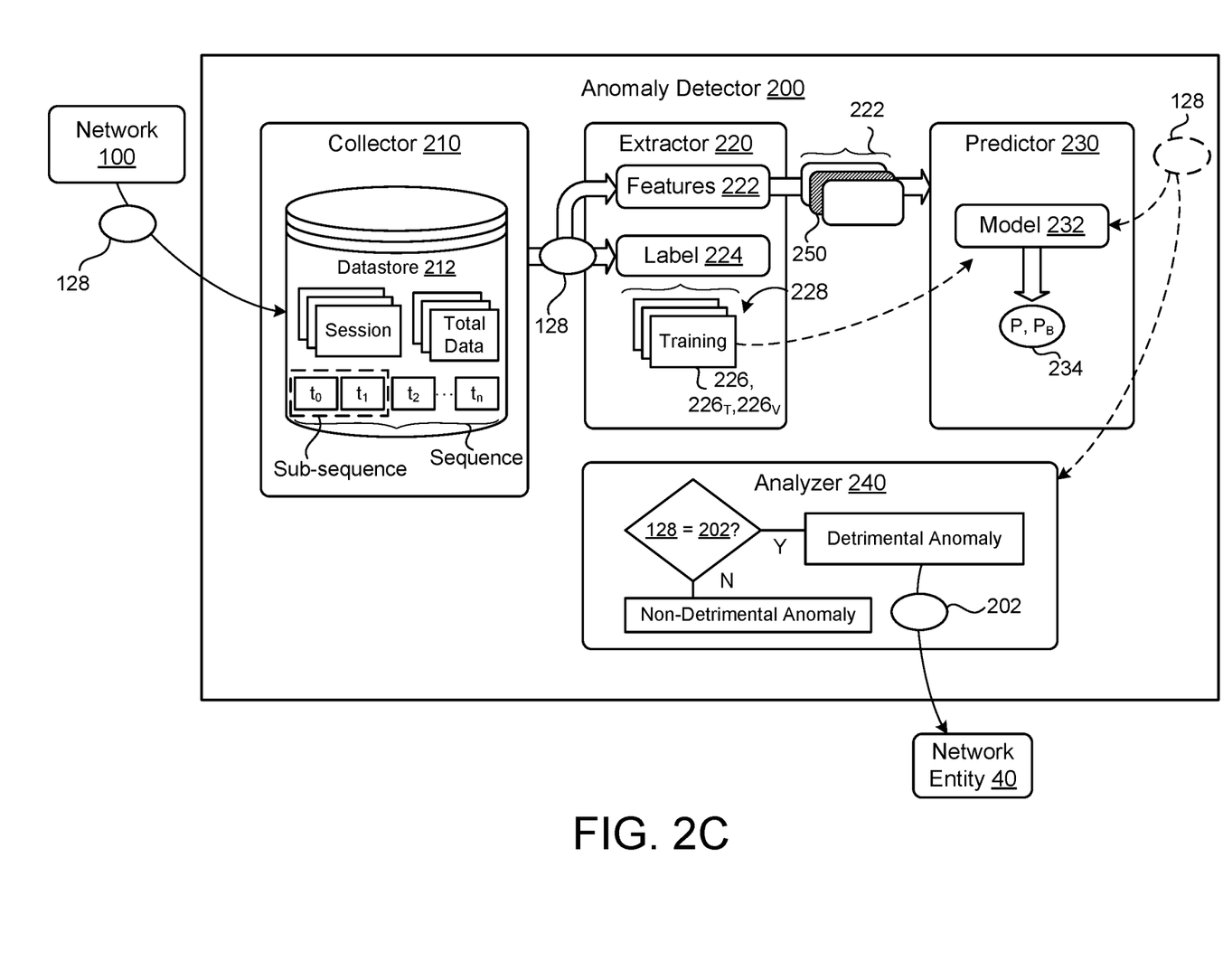
Figure 2D:
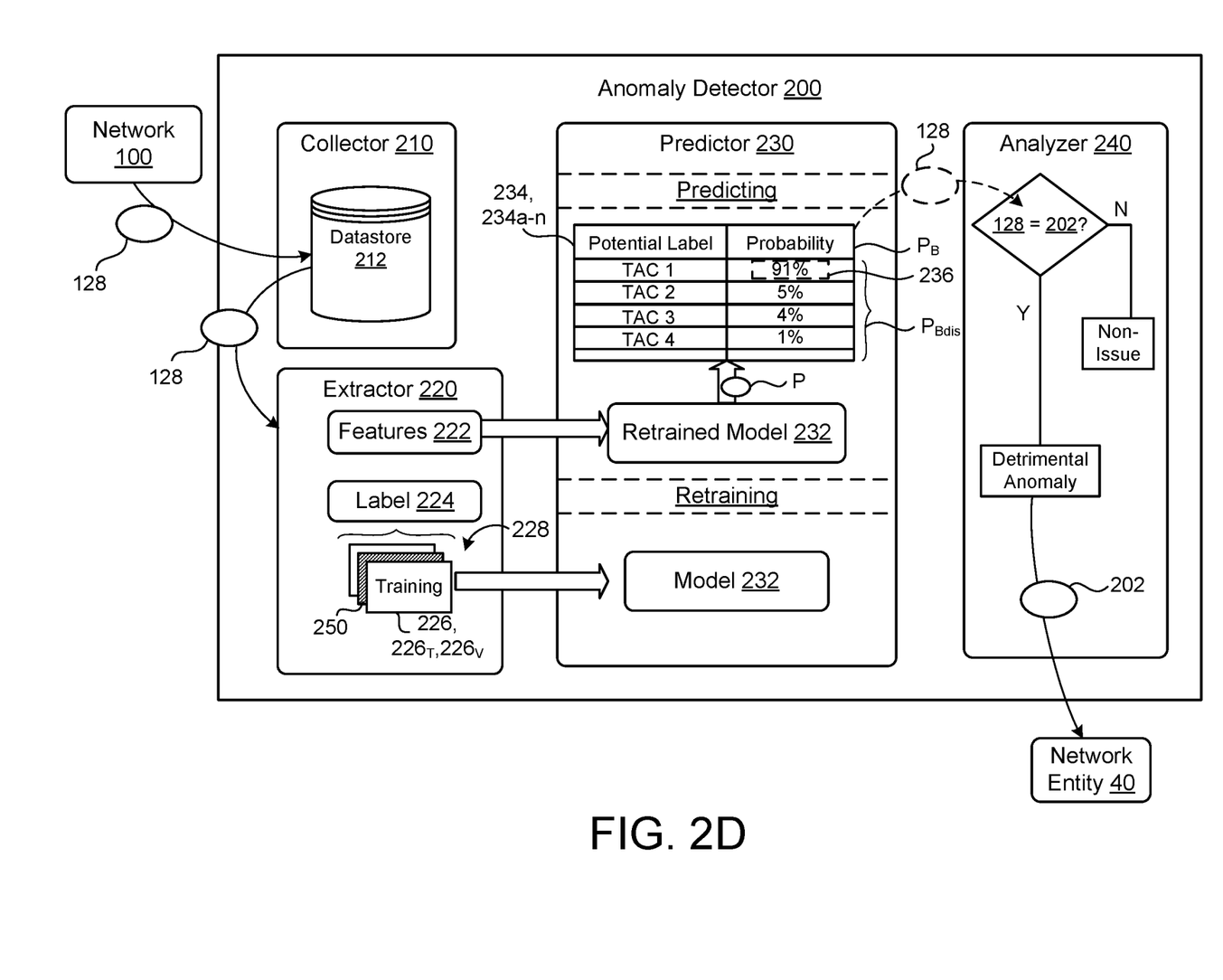

With reference to FIGS. 2B and 2D, in some examples, the predictive model 232 of the predictor 230 generates a probability PB for a prediction P of a potential label 234. To evaluate the probability PB of the potential label 234, the predictor 230 may apply a confidence threshold 236. The confidence threshold 236 indicates a level of confidence that the probability PB of the potential label 234 corresponds to an anomaly that requires evaluation by the analyzer 240 for detrimental behavior. In other words, when the prediction probability PB of the potential label 234 satisfies the confidence threshold 236, the predictor 230 communicates the control message 128 corresponding to the potential label 234 to the analyzer 240. For instance, when the confidence threshold 236 is 90%, a probability PB for a prediction P of a potential label 234 indicative of a TAC that is greater than 90% indicates a confident prediction P that should pass to the analyzer 240 to be further analyzed.

In some configurations, the predictive model 232 outputs/predicts a probability distribution $P_{Bdis}$ over potential labels 234a-n. In these configurations, each potential label 234a-n in the probability distribution $P_{Bdis}$ includes a corresponding probability PB. In some examples, the predictor 230 predicts the potential label 234 by selecting the potential label 234a-n having the highest probability PB in the probability distribution $P_{Bdis}$ over potential labels 234a-n. In the example shown in FIGS. 2B and 2D, the potential label 234a has the highest probability PB of ninety-one percent (91%) in the probability distribution $P_{Bdis}$ over potential labels 234a-n, and therefore the predictor 230 selects the potential label 234a and compares the probability PB (91%) to the confidence threshold (90%). Thus, in the example, the predictor 230 determines that the probability PB of the selected potential label 234a satisfies the confidence threshold 236 and passes the corresponding control message 128 to the analyzer 240 to determine whether the control message 128 corresponds to a respective network performance issue 202 impacting network performance. In some scenarios, the predictor 230 communicates to the analyzer 240 each potential label 234a-n in the in the probability distribution $P_{Bdis}$ that has a corresponding probability PB satisfying the confidence threshold 236.

In some configurations, the predictive model 232 is an RNN model that is better suited (than a DNN model) for sequential data. For an RNN model, the extractor 220 generates sequences for the features 222. In other words, the extractor 220 may form the training control messages 226 from sequential control messages 128 (or sequential features 222 from sequential control messages 128). With sequential features 222, each sequence may be a training example such that sequential features 222 would be split into a training data set, a validation data set, and a test data set. Besides preferring sequential data, the RNN model operates relatively similar to the previously described predictive model 232.

In some examples, the predictive model 232 has difficulty distinguishing different potential labels 234 that perform similarly. For instance, when predicting TAC, there may be several TACs (e.g., three TACs) that perform identically. This identical behavior results in the predictive model 232 confidently knowing that the TAC is one of the three TACs, but not being able to predict exactly which TAC. To overcome this issue, the predictor 230 may use principal component analysis (PCA) to identify groupings of labels 234 that perform similarly (e.g., like the three TACs). Using PCA, the prediction P of the potential label 234 may be a vector where PCA identifies which groupings of labels 224 are commonly predicted together. For example, the PCA will identify that the three TACs should be considered together because the principal component vectors of these three TACs will have strong peaks indicating that they should be grouped (or considered) together.

Referring to FIGS. 2C and 2D, the anomaly detector 200 may also include a filter 250. The filter 250 is configured to prevent redundant analysis of similar detected anomalies. In other words, the anomaly detector 200 generates a filter 250 when an anomaly has been detected. The filter 250 may be for an anomaly of detrimental behavior or for an anomaly of non-detrimental behavior (i.e., acceptable behavior). Once the analyzer 240 has determined whether or not a control message 128 corresponding to an anomaly affects network performance, performing this same analysis for a similar control message 128 or sequence of similar control messages 128 may defer anomaly detection resources from detecting new anomalies or anomalies that need to be analyzed. Accordingly, the filter 250 attempts to prevent repeat analysis. For instance, when the analyzer 240 determines a control message 128 corresponds to a respective network issue 202 that affects network performance, the respective network issue 202 and/or control message 128 is reported to the responsible network entity 40. Here, it would be redundant to re-analyze and report similar control messages 128 to the network entity 40 because the respective network issue 202 has been reported and will be addressed by the responsible network entity 40 in due course. On the other hand, when the analyzer 240 determines a control message does not affect network performance, the anomaly associated with the control message 128 is non-detrimental, and therefore acceptable. Accordingly, it would be pointless to re-analyze subsequent similar control messages 128.

The anomaly detector 200 may generally apply the filter 250 in two scenarios: (1) on features 222 extracted from control messages 128 prior to input to the predictive model 232; or (2) on the set 228 of training control messages 226 used to train the predictive model 232. In some examples (i.e., the first scenario), the anomaly detector 200 applies the filter 250 after the predictive model 232 has been trained, but before one or more features 222 extracted from a subsequent control message 128 are input to the trained predictive model 232 for prediction P of a subsequent potential label 234. Here, the anomaly detector 200 identifies that at least one of the one or more of the corresponding features 222 extracted from the subsequent control message 128 match the one or more features 222 extracted from a previous control message 128 having a predicted potential label 234 indicative of a network anomaly, (i.e., the predicted potential label 234 satisfies a confidence threshold 236). Thereafter, prior to using the predictive model 232 to predict a corresponding potential label 234 for the subsequent control message 128, the anomaly detector 200 applies the filter 250 to remove the identified at least one of the one or more corresponding features 222 extracted from the subsequent control message 128 from use as feature inputs to the predictive model 232. Accordingly, any prediction P output by the predictive model 232 at the predictor 230 for a potential label 234 will not be based on features 222 extracted from previous control messages 128 having predicted potential labels 234 indicative of a network anomaly, regardless of whether the analyzer 240 determined the network anomaly was non-detrimental or impacted network performance. For example, FIG. 2C illustrates the filter 250 in grey blocking and/or removing one of the three features 222 being communicated to the predictor 230 to predict a potential label 234 for a subsequent control message 128.

In other examples (i.e., the second scenario), such as in FIG. 2D, the anomaly detector 200 re-trains the predictive model 232 so that any features 222 extracted from control messages 128 previously identified as having a prediction P of a potential label 234 indicative of a network anomaly are removed from the set 228 of training control messages 226. This approach may also be applicable whether or not the control message 128 corresponds to a network performance issue 202. To re-train the predictive model 232, the anomaly detector 200 first identifies the one or more features 222 extracted from a prior control message 128 having a potential label 234 indicative of the network anomaly. Then, prior to using the predictive model 232 to predict P a corresponding potential label 234 for a subsequent control message 128, the anomaly detector 200 modifies the set 228 of training control messages 226 by removing each training control message 226 that includes one or more corresponding features 222 that match any of the identified one or more features 222 extracted from the prior control message 128. Thereafter, anomaly detector 200 re-trains the predictive model 232 on the modified set 228 of training control messages 226. For instance, FIG. 2D depicts the filter 250 modifying the set 228 of training control messages 226 by removing one of the three training control messages 226 from a retraining set (i.e., modified set 228) of training control messages 226. Once the one or more training control messages 226 have been removed, the filter 250 retrains the predictive model 232 one the modified set 228 of training control messages 226. In other words, if the predictive model 232 is not trained to detect which features 222 are indicative of an anomaly, the anomaly will subsequently be undetected, and thus ignored.

Additionally or alternatively, when a detected anomaly indicates a respective network performance issue 202 and the network performance issue 202 has subsequently been resolved, the anomaly detector 200 may be configured to remove any filter 250 relating to the resolved network performance issue 202. In configurations where the predictive model 232 is an RNN model, the anomaly detector 200 may selectively apply a filter 250. In other words, rather than removing an entire sequence as a feature 222, the filter 250 may remove part of a sequence of the feature 222 that correspond to a particular control message(s) 128 of a detected anomaly. Advantageously, the filter 250 may remove this part of the sequence before the sequence splits into smaller sequences. For instance, when the filter 250 identifies when there are too many CreateSessionRequest messages with a small time period, these individual messages can be completely or partially removed.

Figure 3:
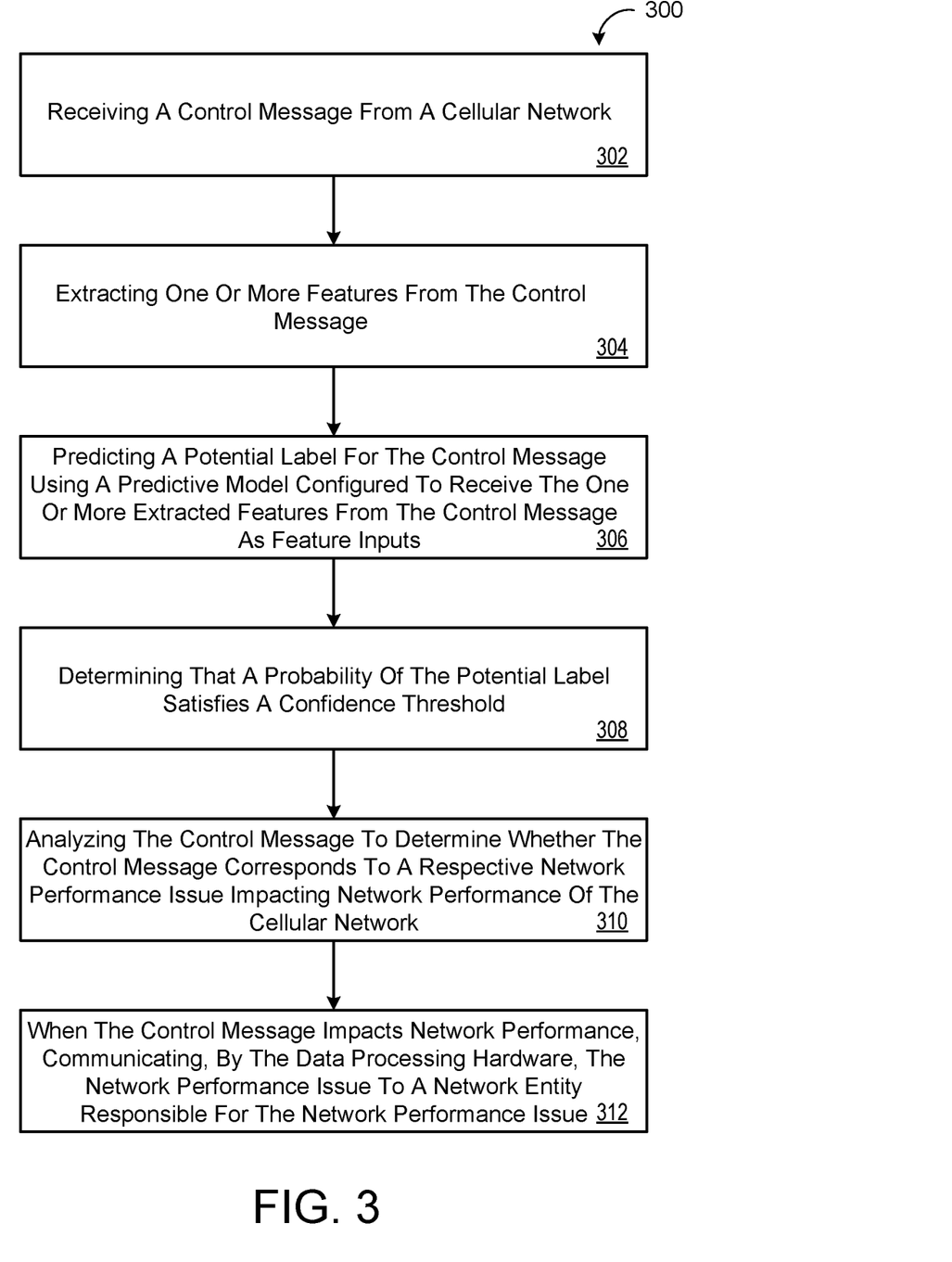
FIG. 3 is a flow chart of an example method for detecting network anomalies.

FIG. 3 illustrates a flow diagram of an example method 300 for detecting network anomalies. At operation 302, the method 300 receives a control message 128 from a cellular network 100. At operations 304, the method 300 extracts one or more features 222 from the control message 128. At operation 306, the method 300 predicts a potential label 234 for the control message using a predictive model 232 configured to receive the one or more extracted features 222 from the control message 128 as feature inputs. The predictive model 232 is trained on a set of training control message 226 where each training control message 226 includes one or more corresponding features 222 and an actual label 224. At operation 308, the method 300 determines that a probability PB of the potential label 234 satisfies a confidence threshold 236. At operation 310, the method 300 analyzes the control message 128 to determine whether the control message 128 corresponds to a respective network performance issue 202 impacting network performance of the cellular network 100. At operation 312, when the control message 128 corresponds to the respective network performance issue impacting network performance, the method 300 communicates the network performance issue 202 to a network entity 40 responsible for the network performance issue 202.

In some examples, when the control message 128 fails to correspond to the respective network performance issue 202, the method 300 receives a subsequent control message 128 from the cellular network 100 and extracts one or more corresponding features 222 from the subsequent control message 128. In these examples, the method 300 also identifies that at least one of the one or more corresponding features 222 extracted from the subsequent control message 128 match the one or more features 222 extracted from the control message 128. Here, prior to using the predictive model 232 to predict a corresponding potential label 234 for the a subsequent control message, the method 300 removes the identified at least one of the one or more features 222 extracted from the subsequent control message 128 as feature inputs to the predictive model 232. In some implementations, when the control message 128 fails to correspond to the respective network performance issue 202, the method 300 identifies the one or more features 222 extracted from the control message 128. Here, in addition to identifying the one or more features 222, the method 300, prior to using the predictive model 232 to predict a corresponding potential label 234 for a subsequent control message 128, modifies the set 228 of training control messages 226 by removing each training control message 226 that includes one or more of corresponding features that match any of the identified one or more features 222 extracted from the control message 128 and re-training the predictive model 232 with the modified set 228 of training control messages 226.

Figure 4:
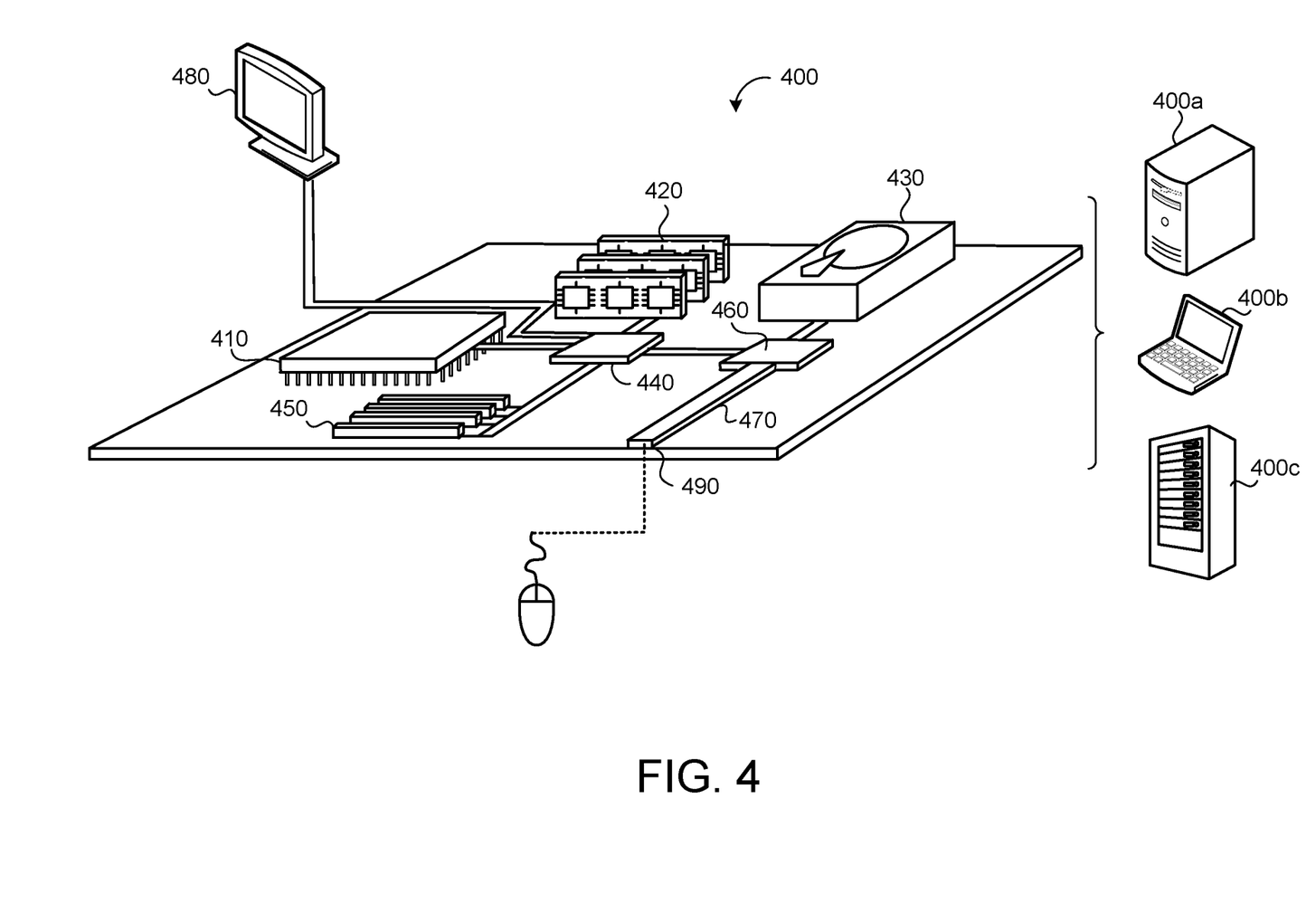
FIG. 4 is a schematic view of an example computing device that may be used to implement the systems and methods described herein.

FIG. 4 is schematic view of an example computing device 400 that may be used to implement the systems (e.g., the anomaly detector 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (i.e., data processing hardware), memory 420 (i.e., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a control message from a cellular network;
   extracting, by the data processing hardware, one or more features from the control message;
   predicting, by the data processing hardware, a potential label for the control message using a predictive model configured to receive the one or more extracted features from the control message as feature inputs, the predictive model trained on a set of training control messages, each training control message comprising one or more corresponding features and an actual label;
   determining, by the data processing hardware, that a probability of the potential label satisfies a confidence threshold;
   analyzing, by the data processing hardware, the control message to determine whether the control message corresponds to a respective network performance issue impacting network performance of the cellular network; and
   when the control message corresponds to the respective network performance issue impacting network performance, communicating, by the data processing hardware, the network performance issue to a network entity responsible for the network performance issue.

2. The method of claim 1, wherein predicting the potential label using the predictive model comprises predicting a probability distribution over potential labels, the predicted potential label comprising one of the potential labels in the probability distribution over potential labels.

3. The method of claim 2, wherein predicting the potential label comprises selecting the potential label associated with a highest probability in the probability distribution over potential labels.

4. The method of claim 1, further comprising, when the control message fails to correspond to the respective network performance issue:
   receiving, at the data processing hardware, a subsequent control message from the cellular network;
   extracting, by the data processing hardware, one or more corresponding features from the subsequent control message;
   identifying, by the data processing hardware, that at least one of the one or more corresponding features extracted from the subsequent control message match the one or more features extracted from the control message; and
   prior to using the predictive model to predict a corresponding potential label for the subsequent control message, removing, by the data processing hardware, the identified at least one of the one or more corresponding features extracted from the subsequent control message from use as feature inputs to the predictive model.

5. The method of claim 1, further comprising, when the control message fails to correspond to the respective network performance issue:
   identifying, by the data processing hardware, the one or more features extracted from the control message; and
   prior to using the predictive model to predict a corresponding potential label for a subsequent control message:
      modifying, by the data processing hardware, the set of training control messages by removing each training control message that comprises one or more corresponding features that match any of the identified one or more features extracted from the control message; and
      retraining, by the data processing hardware, the predictive model with the modified set of training control messages.

6. The method of claim 1, wherein the predictive model comprises a multi-class classification model configured to predict one or more types of labels.

7. The method of claim 1, wherein the actual label of each training control message comprises a type allocation code (TAC) for a user equipment (UE) device associated with the training control message.

8. The method of claim 1, wherein the actual label of each training control message comprises an identifier for a network element of the cellular network.

9. The method of claim 1, wherein the cellular network communicates the control message according to a general packet radio service tunneling protocol (GTP-C).

10. The method of claim 1, wherein the cellular network communicates the control message according to a Diameter protocol.

11. The method of claim 1, wherein the control message corresponds to one of a plurality of control messages sent by a user of the cellular network during a single network session.

12. The method of claim 1, wherein the one or more features extracted from the control message comprise a message type summary vector representing a number of times a message type occurs within a single session by a user of the cellular network.

13. The method of claim 1, wherein the features comprise an amount of data transferred in a time period associated with a single session by a user of the cellular network.

14. The method of claim 1, wherein the predictive model comprises a deep neural network or a recurrent neural network.

15. The method of claim 1, wherein analyzing the control message to determine whether the control message corresponds to the respective network performance issue impacting network performance of the cellular network comprises clustering the control message into a cluster that shares a respective one of the one or more extracted features from the control message.

16. A system comprising:
   data processing hardware; and
   memory hardware in communication with the data processing hardware, the memory hardware storing instructions that when executed on the data processing hardware cause the data processing hardware to perform operations comprising:
      receiving a control message from cellular network;
      extracting one or more features from the control message;
      predicting a potential label for the control message using a predictive model configured to receive the one or more extracted features from the control message as feature inputs, the predictive model trained on a set of training control messages, each training control message comprising one or more corresponding features and an actual label;
      determining that a probability of the potential label satisfies a confidence threshold;
      analyzing the control message to determine whether the control message corresponds to a respective network performance issue impacting network performance of the cellular network; and
      when the control message corresponds to the respective network performance issue impacting network performance, communicating, by the data processing hardware, the network performance issue to a network entity responsible for the network performance issue.

17. The system of claim 16, wherein predicting the potential label using the predictive model comprises predicting a probability distribution over potential labels, the predicted potential label comprising one of the potential labels in the probability distribution over potential labels.

18. The system of claim 17, wherein predicting the potential label comprises selecting the potential label associated with a highest probability in the probability distribution over potential labels.

19. The system of claim 16, wherein the operations further comprise, when the control message fails to correspond to the respective network performance issue:
   receiving a subsequent control message from the cellular network;
   extracting one or more corresponding features from the subsequent control message;
   identifying that at least one of the one or more corresponding features extracted from the subsequent control message match the one or more features extracted from the control message; and
   prior to using the predictive model to predict a corresponding potential label for the subsequent control message, removing the identified at least one of the one or more corresponding features extracted from the subsequent control message from use as feature inputs to the predictive model.

20. The system of claim 16, wherein the operations further comprise, when the control message fails to correspond to the respective network performance issue:
   identifying the one or more features extracted from the control message; and
   prior to using the predictive model to predict a corresponding potential label for a subsequent control message:
      modifying the set of training control messages by removing each training control message that comprises one or more corresponding features that match any of the identified one or more features extracted from the control message; and
      retraining the predictive model with the modified set of training control messages.

21. The system of claim 16, wherein the predictive model comprises a multi-class classification model configured to predict one or more types of labels.

22. The system of claim 16, wherein the actual label of each training control message comprises a type allocation code (TAC) for a user equipment (UE) device associated with the training control message.

23. The system of claim 16, wherein the actual label of each training control message comprises an identifier for a network element of the cellular network.

24. The system of claim 16, wherein the cellular network communicates the control message according to a general packet radio service tunneling protocol (GTP-C).

25. The system of claim 16, wherein the cellular network communicates the control message according to a Diameter protocol.

26. The system of claim 16, wherein the control message corresponds to one of a plurality of control messages sent by a user of the cellular network during a single network session.

27. The system of claim 16, wherein the one or more features extracted from the control message comprise a message type summary vector representing a number of times a message type occurs within a single session by a user of the cellular network.

28. The system of claim 16, wherein the features comprise an amount of data transferred in a time period associated with a single session by a user of the cellular network.

29. The system of claim 16, wherein the predictive model comprises a deep neural network or a recurrent neural network.

30. The system of claim 16, wherein analyzing the control message to determine whether the control message corresponds to the respective network performance issue impacting network performance of the cellular network comprises clustering the control message into a cluster that shares a respective one of the one or more extracted features from the control message.

* * * * *